US011138549B2

(12) United States Patent
Kotake et al.

(10) Patent No.: US 11,138,549 B2
(45) Date of Patent: Oct. 5, 2021

(54) DELIVERY PLAN MAKING SYSTEM AND DELIVERY PLAN MAKING METHOD

(71) Applicant: Hitachi Transport System, Ltd., Tokyo (JP)

(72) Inventors: Kouichi Kotake, Tokyo (JP); Takashi Atsumi, Tokyo (JP); Takaharu Sakurada, Tokyo (JP); Junko Hosoda, Tokyo (JP)

(73) Assignee: Hitachi Transport System, Ltd., Tokyo (JP)

( * ) Notice: Subject to any disclaimer, the term of this patent is extended or adjusted under 35 U.S.C. 154(b) by 214 days.

(21) Appl. No.: 16/093,836

(22) PCT Filed: Apr. 25, 2016

(86) PCT No.: PCT/JP2016/062911
§ 371 (c)(1),
(2) Date: Oct. 15, 2018

(87) PCT Pub. No.: WO2017/187482
PCT Pub. Date: Nov. 2, 2017

(65) Prior Publication Data
US 2019/0080287 A1 Mar. 14, 2019

(51) Int. Cl.
*G06Q 10/08* (2012.01)
*G06Q 50/28* (2012.01)
(Continued)

(52) U.S. Cl.
CPC ....... *G06Q 10/08355* (2013.01); *B65G 61/00* (2013.01); *G06Q 10/047* (2013.01);
(Continued)

(58) Field of Classification Search
CPC ............ G06Q 10/08355; G06Q 50/28; G06Q 10/047; G06Q 10/06312; G06Q 10/06315; B65G 61/00
See application file for complete search history.

(56) References Cited

U.S. PATENT DOCUMENTS 5,897,629 A * 4/1999 Shinagawa ............ G06N 3/126
706/13
7,225,983 B2 * 6/2007 Park ....................... G06Q 10/08
235/385

(Continued)

FOREIGN PATENT DOCUMENTS

ER 2 254 082 A1 11/2010
JP 11-31294 A 2/1999

(Continued)

OTHER PUBLICATIONS

Abdelaziz Benantar, Rachid Ouafi. "Optimization of Vehicle Routes: An Application to Logistic and Transport of the Fuel Distribution." 9th International Conference on Modeling, Optimization & SIMulation, Jun. 2012. (Year: 2012).*

(Continued)

*Primary Examiner* — Nathan A Mitchell
(74) *Attorney, Agent, or Firm* — Crowell & Moring LLP

(57) ABSTRACT

The invention is directed to a delivery plan making system that makes a delivery plan of articles, the system including: a storage unit that stores a restriction condition for making a delivery plan and cost information used for calculating a delivery cost based on the delivery plan; a delivery plan making and cost calculating unit that makes a delivery plan before alleviation of the restriction condition to satisfy the restriction condition and calculates a delivery cost of the delivery plan before the alleviation based on the cost information; and a restriction alleviating unit that alleviate the restriction condition to generate a restriction alleviation (Continued)

plan, wherein the delivery plan making and cost calculating unit further makes a delivery plan after alleviation of the restriction condition so as to satisfy the restriction alleviation plan and calculates a delivery cost of the delivery plan after the alleviation based on the cost information, and outputs the restriction alleviation plan if the delivery cost of the delivery plan after the alleviation is lower than the delivery cost of the delivery plan before the alleviation.

8 Claims, 12 Drawing Sheets

(51) Int. Cl.
　　　B65G 61/00　　　(2006.01)
　　　G06Q 10/04　　　(2012.01)
　　　G06Q 10/06　　　(2012.01)
(52) U.S. Cl.
　　　CPC . *G06Q 10/06312* (2013.01); *G06Q 10/06315* (2013.01); *G06Q 50/28* (2013.01)

(56) References Cited

U.S. PATENT DOCUMENTS

| | | | |
|---|---|---|---|
| 10,043,150 B2* | 8/2018 | Arunapuram | G06Q 10/047 |
| 2002/0138358 A1* | 9/2002 | Scheer | G06Q 10/0637 |
| | | | 705/7.36 |
| 2003/0078802 A1* | 4/2003 | Yonezawa | G06Q 10/08 |
| | | | 705/338 |
| 2004/0107110 A1* | 6/2004 | Gottlieb | G06Q 10/047 |
| | | | 705/6 |
| 2007/0219836 A1* | 9/2007 | Funaki | G06Q 10/063 |
| | | | 705/7.25 |
| 2008/0004995 A1* | 1/2008 | Klingenberg | G06Q 10/08 |
| | | | 705/28 |
| 2010/0287073 A1* | 11/2010 | Kocis | G06Q 10/08355 |
| | | | 705/28 |
| 2010/0312715 A1* | 12/2010 | Esque | G06Q 50/32 |
| | | | 705/330 |
| 2011/0071955 A1 | 3/2011 | Nakamura et al. | |
| 2011/0178945 A1* | 7/2011 | Hirai | G06Q 10/08355 |
| | | | 705/338 |
| 2012/0030133 A1* | 2/2012 | Rademaker | G06Q 10/08 |
| | | | 705/333 |
| 2012/0226624 A1* | 9/2012 | Song | G06Q 10/083 |
| | | | 705/338 |
| 2013/0159208 A1* | 6/2013 | Song | G06Q 50/28 |
| | | | 705/338 |
| 2014/0025295 A1* | 1/2014 | Paul | G01C 21/343 |
| | | | 701/527 |
| 2014/0180958 A1* | 6/2014 | Arunapuram | G06Q 10/08355 |
| | | | 705/338 |
| 2014/0279657 A1* | 9/2014 | Stowe | G06Q 10/08345 |
| | | | 705/335 |
| 2015/0170098 A1* | 6/2015 | Glasgow | G06Q 10/0834 |
| | | | 705/334 |
| 2016/0048802 A1* | 2/2016 | Luwang | G06Q 10/08355 |
| | | | 705/338 |
| 2016/0171440 A1* | 6/2016 | Durai Raj | G06Q 10/08355 |
| | | | 705/338 |
| 2016/0180287 A1* | 6/2016 | Chan | G06Q 10/0833 |
| | | | 705/333 |
| 2016/0188816 A1* | 6/2016 | Khainson | G16H 40/20 |
| | | | 705/2 |
| 2017/0270468 A1* | 9/2017 | Natarajan | G06Q 30/08 |
| 2017/0287052 A1* | 10/2017 | High | G06Q 10/083 |
| 2018/0211218 A1* | 7/2018 | Berdinis | G06Q 10/08355 |

FOREIGN PATENT DOCUMENTS

| | | |
|---|---|---|
| JP | 2001-188984 A | 7/2001 |
| JP | 2005-209025 A | 8/2005 |
| JP | 2010-24006 A | 2/2010 |
| JP | 2011-164739 A | 8/2011 |
| JP | 2014-63514 A | 4/2014 |
| JP | 2014-130468 A | 7/2014 |
| WO | WO 2015/154831 A1 | 10/2015 |

OTHER PUBLICATIONS

A. Galić, T. Carić, J. Fosin. "The Case Study of Implementing the Delivery Optimization System at a Fast-Moving Consumer Goods Distributer". Promet—Traffic&Transportation, vol. 25 No. 6, 2013. (Year: 2013).*

G. Desaulniers, J. Desrosiers, A. Erdmann, M.M. Solomon, F. Soumis. "Vrp with pickup and a delivery P. Toth, D. Vigo". The vehicle routing problem, SIAM monographs on discrete mathematics and applications, vol. 9, SIAM, Philadelphia (2002), pp. 225-242. (Year: 2002).*

Extended European Search Report issued in counterpart European Application No. 16900355.5 dated Aug. 8, 2019 (eight (8) pages).

International Search Report (PCT/ISA/210) issued in PCT Application No. PCT/JP2016/062911 dated Jul. 19, 2016 with English translation (three (3) pages).

Japanese-language Written Opinion (PCT/ISA/237) issued in PCT Application No. PCT/JP2016/062911 dated Jul. 19, 2016 (three (3) pages).

Singaporean Written Opinion issued in counterpart Singaporean Application No. 11201809130V dated Sep. 9, 2019 (six (6) pages).

* cited by examiner

[FIG. 1]
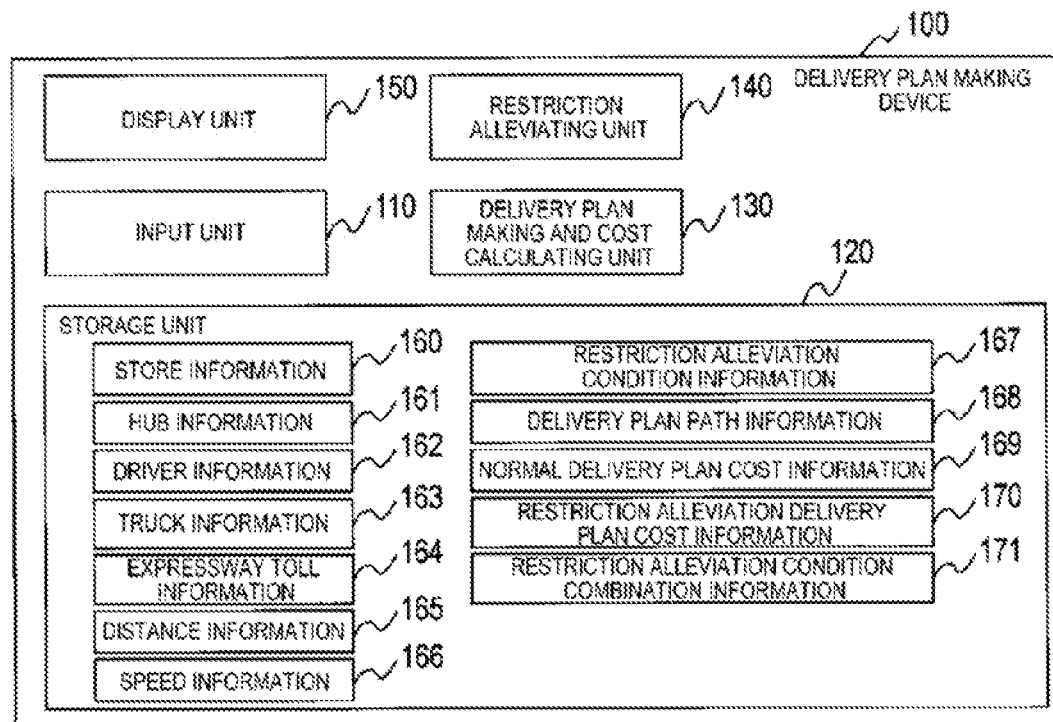

[FIG. 2]
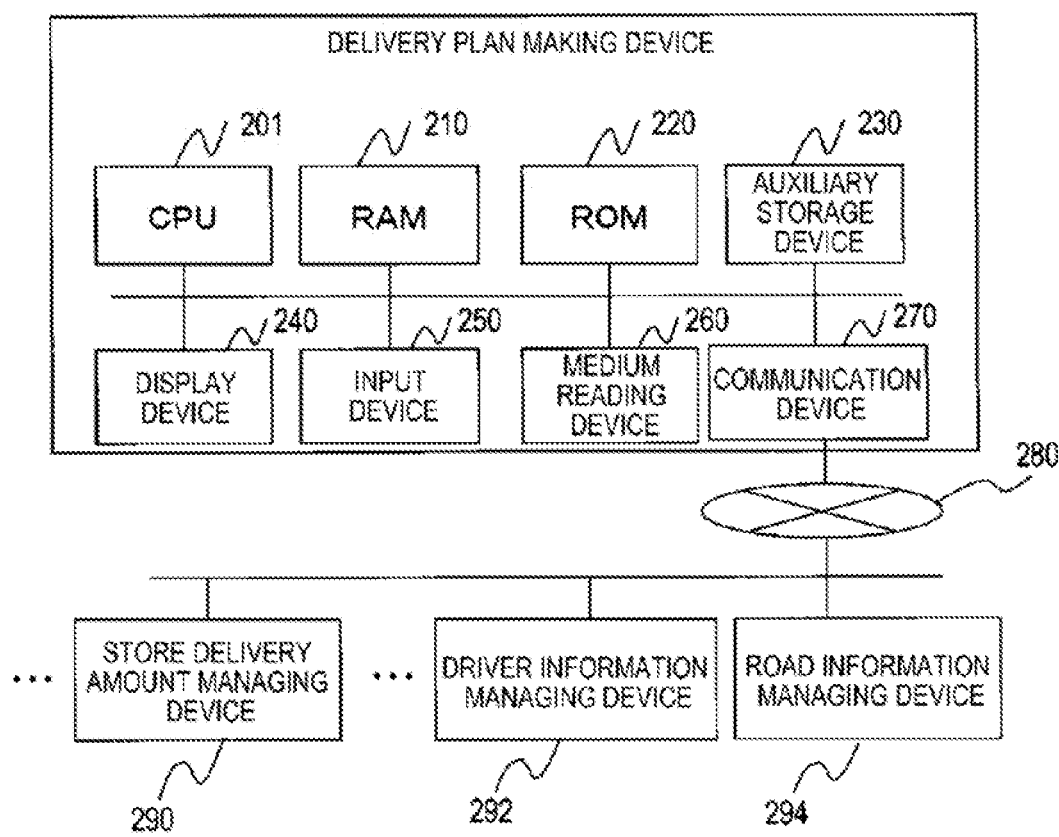

[FIG. 3]

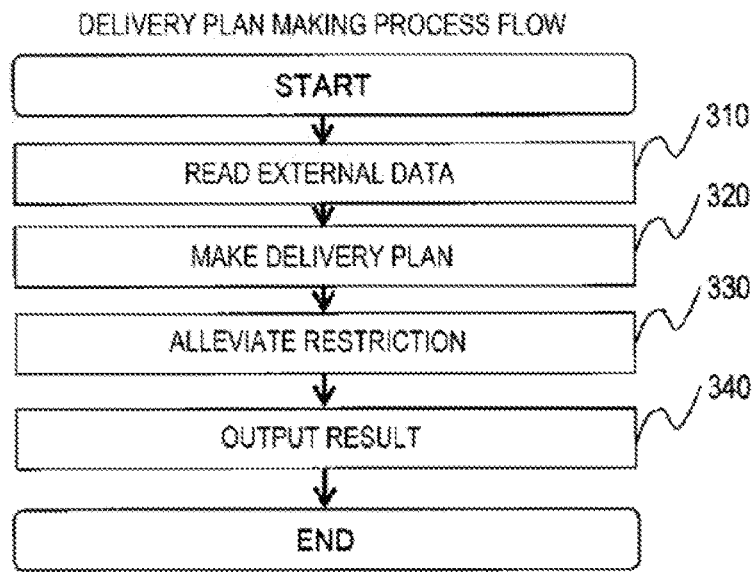

DELIVERY PLAN MAKING PROCESS FLOW

- START
- READ EXTERNAL DATA — 310
- MAKE DELIVERY PLAN — 320
- ALLEVIATE RESTRICTION — 330
- OUTPUT RESULT — 340
- END

[FIG. 4]

STORE INFORMATION 160

| STORE NAME 410 | STORE DELIVERY AMOUNT (t) 420 | AVAILABLE STORE DELIVERY TIME 430 | STORE LOCATION 440 |
|---|---|---|---|
| A | 1 | 0:00 TO 1:00 | KAMAKURA, KANAGAWA PREFECTURE |
| B | 1 | 1:00 TO 2:00 | ISEHARA, KANAGAWA PREFECTURE |
| C | 1 | 2:00 TO 3:00 | YOKOHAMA, KANAGAWA PREFECTURE |
| D | 1 | 2:50 TO 3:30 | KAWASAKI, KANAGAWA PREFECTURE |
| E | 1 | 2:50 TO 3:30 | ODAWARA, KANAGAWA PREFECTURE |

[FIG. 5]

HUB INFORMATION 161

| HUB NAME 510 | HUB LOCATION 520 |
|---|---|
| DEPOT | KOUZA, KANAGAWA PREFECTURE |

[FIG. 6]

DRIVER INFORMATION 162

| DRIVER NAME | ACTUAL WORKABLE TIME OF DRIVER (min) | OVERTIME UNIT COST (10000 yen/hr) |
|---|---|---|
| A | 180 | 0.2 |

[FIG. 7]

TRUCK INFORMATION 163

| TRUCK NAME | MAXIMUM LOAD CAPACITY (t) | TRUCK CHARGE (10000 yen/truck) | TRUCK DRIVER | TRUCK UNLOADING TIME (min) |
|---|---|---|---|---|
| NORMAL TRUCK | 5 | 10000 yen/truck | A | 40 MINUTES |

[FIG. 8]

EXPRESSWAY TOLL INFORMATION

| SECTION | EXPRESSWAY TOLL (10000 yen/section) |
|---|---|
| DEPOT - STORE A SECTION | 0.4 |
| STORE A - STORE B SECTION | 0.4 |
| STORE B - DEPOT SECTION | 0.4 |
| DEPOT - STORE C SECTION | 0.4 |
| STORE C - DEPOT SECTION | 0.4 |
| DEPOT - STORE D SECTION | 0.4 |
| STORE D - DEPOT SECTION | 0.4 |
| DEPOT - STORE E SECTION | 0.4 |
| STORE E - DEPOT SECTION | 0.4 |

[FIG. 9]

DISTANCE INFORMATION 165

| From (910) | To (920) | GENERAL ROAD DISTANCE (km) (930) | EXPRESSWAY DISTANCE (km) (940) |
|---|---|---|---|
| A | A | 0 | 0 |
| A | B | 10 | 0 |
| ... | ... | ... | ... |
| B | A | 10 | 0 |
| B | B | 0 | 0 |
| B | C | 10 | 0 |
| ... | ... | ... | ... |
| C | B | 10 | 0 |
| C | C | 0 | 0 |
| C | D | 20 | 20 |
| C | E | 42 | 0 |
| C | HUB | 10 | 0 |
| ... | | | |
| D | C | 20 | 20 |
| D | D | 0 | 0 |
| D | E | 40 | 0 |
| ... | ... | ... | ... |
| E | HUB | 10 | 0 |
| HUB | A | 10 | 0 |
| HUB | B | 10 | 0 |
| HUB | C | 10 | 0 |
| HUB | D | 10 | 0 |
| HUB | E | 10 | 0 |
| HUB | HUB | 0 | 0 |

[FIG. 10]

SPEED INFORMATION                                      166

| TIME ZONE | GENERAL ROAD SPEED (km/h) | EXPRESSWAY SPEED (km/h) |
|---|---|---|
| 0:00 – 24:00 | 30 | 60 |

[FIG. 11]

RESTRICTION ALLEVIATION CONDITION INFORMATION          167

| RESTRICTION NUMBER | ALLEVIATION CONDITION | ALLEVIATION WIDTH | MAXIMUM ALLEVIATION AMOUNT | APPLICABILITY |
|---|---|---|---|---|
| 1 | STORE A DELIVERY TIME ADVANCEMENT | 30 MINUTES | 60 MINUTES | False |
| ... | ... | ... | ... | ... |
| 2 | STORE D DELIVERY TIME POSTPONEMENT | 10 MINUTES | 120 MINUTES | True |
| 3 | EXPRESSWAY USABLE DISTANCE | 10km | 0km | True |
| 4 | ACTUAL WORKING TIME EXTENSION | 10 MINUTES | 180 MINUTES | True |

[FIG. 12]

1210 RESTRICTION ALLEVIATION CONDITION SETTING SCREEN

| RESTRICTION ALLEVIATION CONDITION SETTING | | | |
|---|---|---|---|
| TARGET SETTING BOX | ALLEVIATION CONDITION | ALLEVIATION WIDTH | MAXIMUM ALLEVIATION AMOUNT |
| ☐ | STORE A DELIVERY TIME ADVANCEMENT | 30 MINUTES | 60 MINUTES |
| ... | ... | ... | ... |
| ☑ | STORE D DELIVERY TIME POSTPONEMENT | 10 MINUTES | 120 MINUTES |
| ☑ | EXPRESSWAY USABLE DISTANCE | 10km | 0km |
| ☑ | ACTUAL WORKING TIME EXTENSION | 10 MINUTES | 180 MINUTES |

[FIG. 13]

DELIVERY PLAN PATH INFORMATION

| DELIVERY PLAN NUMBER | TRUCK NUMBER | TRUCK NAME | From | To | TRAVEL TIME (min) | WORK TIME (min) | EXPRESSWAY USE | TOTAL ACTUAL WORKING TIME (min) |
|---|---|---|---|---|---|---|---|---|
| No.0 | No.1 | NORMAL TRUCK | DEPOT | STORE A | 20 | 40 | × | 60 |
| No.0 | No.1 | NORMAL TRUCK | STORE A | STORE B | 20 | 40 | × | 60 |
| No.0 | No.1 | NORMAL TRUCK | STORE B | DEPOT | 20 | 0 | × | 20 |
| No.0 | No.2 | NORMAL TRUCK | DEPOT | STORE C | 20 | 40 | × | 60 |
| No.0 | No.2 | NORMAL TRUCK | STORE C | DEPOT | 20 | 0 | × | 20 |
| No.0 | No.3 | NORMAL TRUCK | DEPOT | STORE D | 20 | 40 | × | 60 |
| No.0 | No.3 | NORMAL TRUCK | STORE D | DEPOT | 20 | 0 | × | 20 |
| No.0 | No.4 | NORMAL TRUCK | DEPOT | STORE E | 20 | 40 | × | 60 |
| No.0 | No.4 | NORMAL TRUCK | STORE E | DEPOT | 20 | 0 | × | 20 |

[FIG. 14]
NORMAL DELIVERY PLAN COST INFORMATION 169
| DELIVERY PLAN NUMBER | TOTAL DELIVERY COST (10000 yen) | TOTAL TRUCK COST (10000 yen) | TOTAL EXPRESSWAY COST (10000 yen) | TOTAL OVERTIME COST (10000 yen) |
|---|---|---|---|---|
| No.0 | 4 | 4 | 0 | 0 |
[FIG. 15]
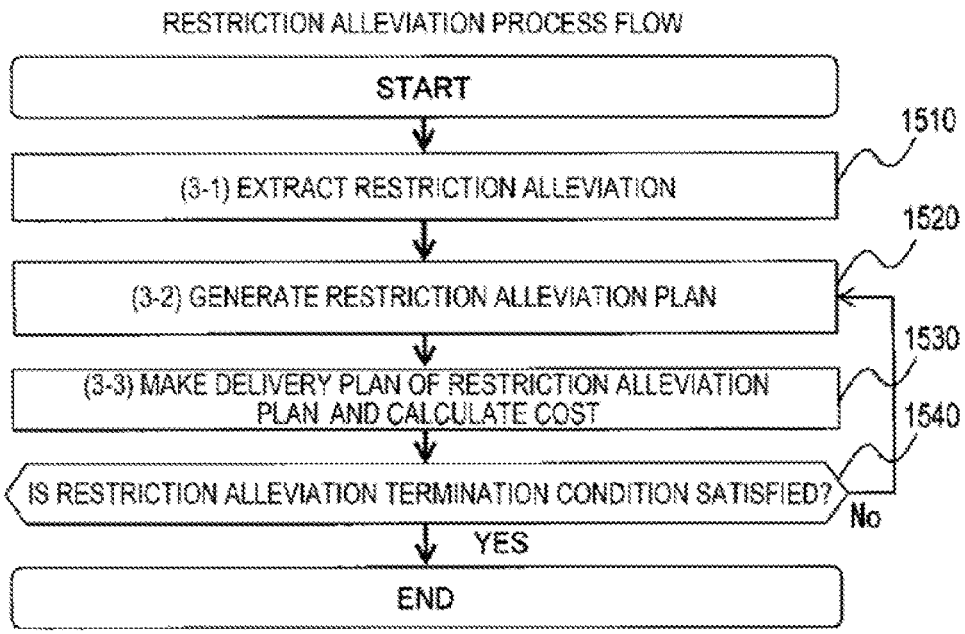
[FIG. 16]
RESTRICTION ALLEVIATION DELIVERY PLAN COST INFORMATION 170
| DELIVERY PLAN NUMBER | TOTAL DELIVERY COST (10000 yen) | TOTAL TRUCK COST (10000 yen) | TOTAL EXPRESSWAY COST (10000 yen) | TOTAL OVERTIME COST (10000 yen) |
|---|---|---|---|---|
| No.1 | 3 | 3 | 0 | 0 |
| No.2 | 3.4 | 3 | 0.4 | 0 |
| No.3 | 3.1 | 3 | 0 | 0.1 |
| No.4 | 2.2 | 2 | 0 | 0.2 |
| No.5 | 3.0 | 2 | 0.8 | 0.2 |

[FIG. 17]

RESTRICTION ALLEVIATION COMBINATION INFORMATION 171

| DELIVERY PLAN NUMBER | RESTRICTION ALLEVIATION | ALLEVIATION AMOUNT |
|---|---|---|
| No.1 | STORE D DELIVERY TIME POSTPONEMENT | 10 MINUTES |
| No.2 | EXPRESSWAY USE | 10km |
| No.3 | ACTUAL WORKING TIME EXTENSION | 50 MINUTES |
| No.4 | EXPRESSWAY USE | 20km |
| No.4 | STORE D DELIVERY TIME POSTPONEMENT | 10 MINUTES |
| No.5 | EXPRESSWAY USE | 10km |
| No.5 | ACTUAL WORKING TIME EXTENSION | 50 MINUTES |

RESTRICTION ALLEVIATION AND DELIVERY COST DISPLAY SCREEN

| DELIVERY PLAN NUMBER | DELIVERY COST (10000 yen) | RESTRICTION ALLEVIATION WIDTH | | |
|---|---|---|---|---|
| | | EXPRESSWAY USE (km) | DELIVERY TIME POSTPONEMENT (min) | ACTUAL WORKING TIME EXTENSION (min) |
| 1 | 3 | NONE | 10 MINUTES | 0 |
| 2 | 3.4 | 10km | — | 0 |
| 3 | 3.1 | NONE | — | 50 MINUTES |
| 4 | 2.2 | NONE | 10 MINUTES | 50 MINUTES |
| 5 | 3.0 | 10km | — | 50 MINUTES |

[FIG. 19]
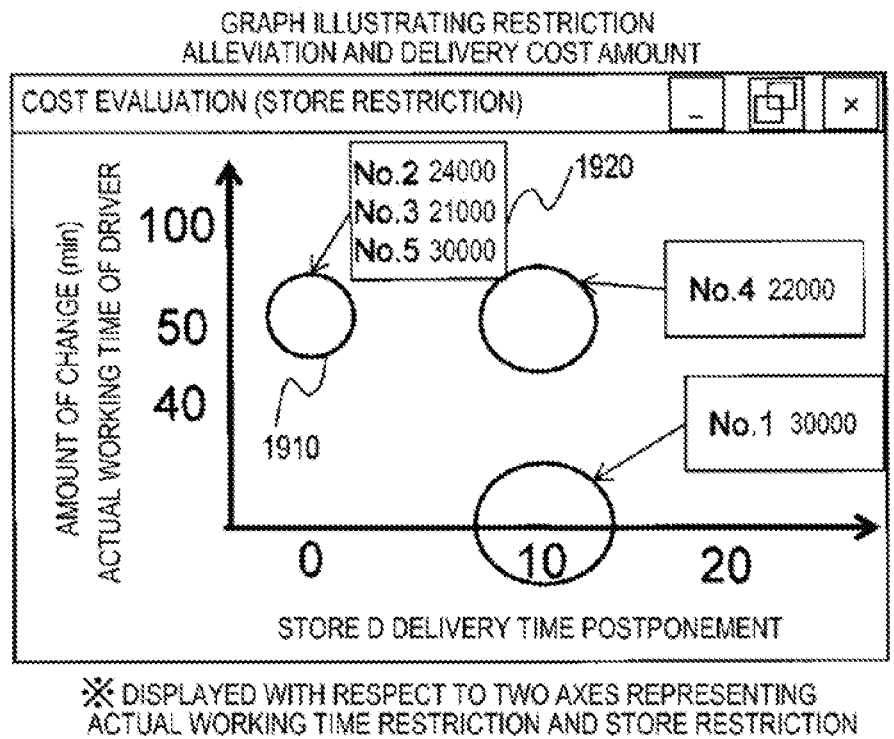
[FIG. 20]
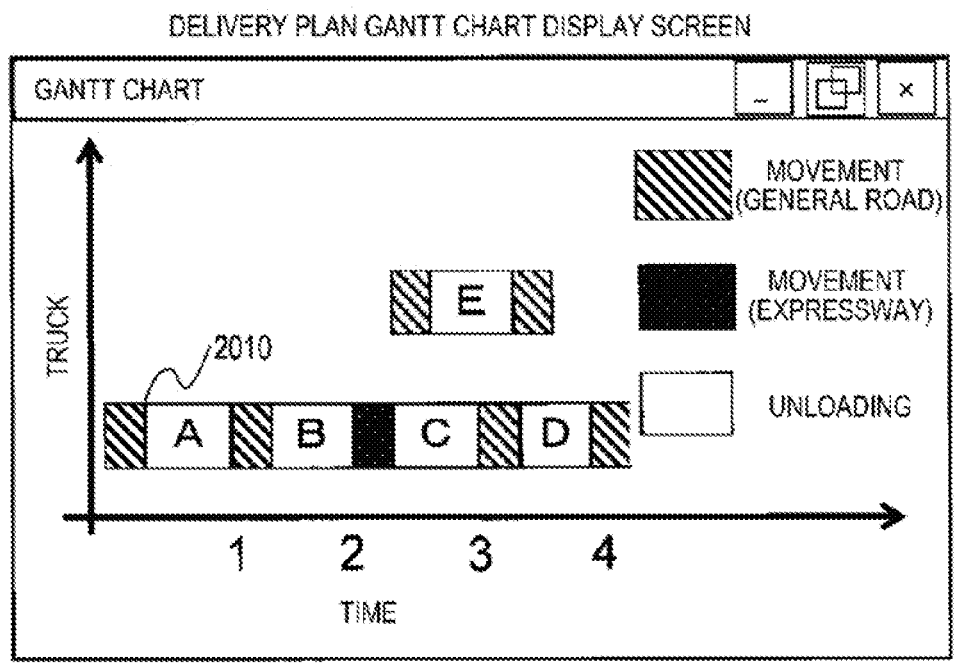

DELIVERY PLAN MAKING SYSTEM AND DELIVERY PLAN MAKING METHOD

TECHNICAL FIELD

The present invention relates to a technique of making a delivery plan of articles.

BACKGROUND ART

As a background art in this technical field, there is JP-A-2011-164739 (PTL 1). This patent literature describes "a delivery plan making method capable of alleviating the arrival time to advance the arrival time in response to designation of the arrival time zone of an order and controlling the balance between observance of the designated time zone and the number of vehicles is provided" (refer to ABSTRACT).

CITATION LIST

Patent Literature

PTL 1: JP-A-2011-164739

SUMMARY OF INVENTION

Technical Problem

PTL 1 describes a mechanism of reducing the number of vehicles by alleviating arrival time information when an article designated in delivery order information is delivered to a delivery destination. However, if the delivery destination is in a multi-tenant building or near a crowded station, an adjustment with neighborhood stores is necessary. Therefore, in practice, the arrival time cannot be changed. On the other hand, there are also restrictions on delivery conditions that do not require an adjustment with delivery destinations, such as an expressway usable distance or actual working hours of a truck driver. By alleviating these restrictions, the number of vehicles may be reduced. There are a plurality of changeable restrictions, and the actual difficulty of change varies depending on the restrictions. In order for a delivery plan maker to select restrictions that can be changed as easily as possible, it is necessary to compare and confirm the results of changing a plurality of restrictions.

In addition, among the restrictions that do not require an adjustment with delivery destinations, there are some restrictions which generate a cost such as an expressway toll or a wage of a driver when alleviated. Accordingly, in order to reduce the delivery cost, it is insufficient to merely reduce the number of vehicles, and it is necessary to reduce a delivery cost including a vehicle charge, an expressway toll, and a wage of a driver.

In the mechanism disclosed in PTL 1 in which only the arrival time information is targeted to be alleviated to reduce the number of vehicles, the results of changing a plurality of restrictions cannot be compared and confirmed, and the reduction of the delivery cost by the restriction alleviation cannot be calculated.

Therefore, there is provided a delivery plan making system that calculates a plurality of restriction alleviation plans (a combination of restrictions, and an alleviation width of each restriction) capable of alleviating a plurality of restrictions and reducing a delivery cost, and a delivery cost.

Solution to Problem

According to the invention for achieving the above-described object, there is provided a delivery plan making system that makes a delivery plan of an article, the system including: a storage unit that stores a restriction condition for making a delivery plan and cost information used for calculating a delivery cost based on the delivery plan; a delivery plan making and cost calculating unit that makes a delivery plan before alleviation of the restriction condition so as to satisfy the restriction condition and calculates a delivery cost of the delivery plan before the alleviation based on the cost information; and a restriction alleviating unit that alleviates the restriction condition to generate a restriction alleviation plan, in which the delivery plan making and cost calculating unit further makes a delivery plan after alleviation of the restriction condition so as to satisfy the restriction alleviation plan and calculates a delivery cost of the delivery plan after the alleviation based on the cost information, and outputs the restriction alleviation plan if the delivery cost of the delivery plan after the alleviation is lower than the delivery cost of the delivery plan before the alleviation.

Advantageous Effects of Invention

According to one aspect of the invention, a delivery cost can be reduced by calculating and providing a restriction alleviation plan.

Objects, configurations, and effects other than those described above will be clarified by the description of the embodiments below.

BRIEF DESCRIPTION OF DRAWINGS

FIG. 1 is a block diagram illustrating an example of a functional configuration of a delivery plan making device according to an embodiment of the invention.

FIG. 2 is a block diagram illustrating an example of a hardware configuration of the delivery plan making device according to the embodiment of the invention.

FIG. 3 is a flowchart illustrating an example of a delivery plan making process that is executed by the delivery plan making device according to the embodiment of the invention.

FIG. 4 is a diagram illustrating an example of store information that is referred to by the delivery plan making device according to the embodiment of the invention.

FIG. 5 is a diagram illustrating an example of hub information that is referred to by the delivery plan making device according to the embodiment of the invention.

FIG. 6 is a diagram illustrating an example of driver information that is referred to by the delivery plan making device according to the embodiment of the invention.

FIG. 7 is a diagram illustrating an example of truck information that is referred to by the delivery plan making device according to the embodiment of the invention.

FIG. 8 is a diagram illustrating an example of expressway toll information that is referred to by the delivery plan making device according to the embodiment of the invention.

FIG. 9 is a diagram illustrating an example of distance information that is referred to by the delivery plan making device according to the embodiment of the invention.

FIG. 10 is a diagram illustrating an example of speed information that is referred to by the delivery plan making device according to the embodiment of the invention.

FIG. 11 is a diagram illustrating an example of restriction alleviation condition information that is referred to by the delivery plan making device according to the embodiment of the invention.

FIG. 12 is a diagram illustrating an example of a restriction alleviation condition setting screen that is output from the delivery plan making device according to the embodiment of the invention.

FIG. 13 is a diagram illustrating an example of delivery plan path information that is stored by the delivery plan making device according to the embodiment of the invention.

FIG. 14 is a diagram illustrating an example of normal delivery plan cost information that is stored by the delivery plan making device according to the embodiment of the invention.

FIG. 15 is a flowchart illustrating an example of a restriction alleviation process that is executed by the delivery plan making device according to the embodiment of the invention.

FIG. 16 is a diagram illustrating an example of restriction alleviation delivery plan cost information that is stored by the delivery plan making device according to the embodiment of the invention.

FIG. 17 is a diagram illustrating an example of restriction alleviation condition combination information that is stored by the delivery plan making device according to the embodiment of the invention.

FIG. 18 is a diagram illustrating an example of restriction alleviation and delivery cost display screen that is output from the delivery plan making device according to the embodiment of the invention.

FIG. 19 is a diagram illustrating an example of a graph display of restriction alleviations and delivery cost amounts that are output from the delivery plan making device according to the embodiment of the invention.

FIG. 20 is a diagram illustrating an example of a delivery plan Gantt chart display screen that is output from the delivery plan making device according to the embodiment of the invention.

DESCRIPTION OF EMBODIMENTS

Hereinafter, embodiments will be described with reference to the drawings.

FIG. 1 is a block diagram illustrating an example of a functional configuration of a delivery plan making device according to the embodiment of the invention.

The delivery plan making device 100 includes an input unit 110, a storage unit 120, a delivery plan making and cost calculating unit 130, a restriction alleviating unit 140, and a display unit 150.

The input unit 110 is a user interface that reads data (external data) stored in the outside of the device.

As described below, the storage unit 120 stores data read by the input unit 110 and data calculated by the delivery plan making and cost calculating unit 130.

The delivery plan making and cost calculating unit 130 reads store information 160, hub information 161, driver information 162, truck information 163, expressway toll information 164, distance information 165, speed information 166, and restriction alleviation condition information 167, which are stored in the storage unit 120, calculates delivery plan path information 168, normal delivery plan cost information 169, restriction alleviation delivery plan cost information 170, and restriction alleviation condition combination information 171, and stores the calculation results in the storage unit 120.

The restriction alleviating unit 140 selects restrictions to be alleviated from the restriction alleviation condition information stored in the storage unit 120, and generates a restriction alleviation plan (that is, a combination of the restrictions, and an alleviation width of each restriction) which alleviates the selected restrictions stepwise.

The display unit 150 is a user interface for displaying the delivery plan path information, the normal delivery plan cost information, the restriction alleviation delivery plan cost information, and the restriction alleviation condition combination information, which are calculated.

The delivery plan making device 100 is controlled by a delivery plan making program that executes a delivery plan making process.

FIG. 2 is a block diagram illustrating an example of a hardware configuration of the delivery plan making device 100 according to the embodiment of the invention.

The delivery plan making device 100 includes a CPU (Central Processing Unit) 201, a RAM (Random Access Memory) 210, a ROM (Read Only Memory) 220, an auxiliary storage device 230, a display device 240, an input device 250, a medium reading device 260, and a communication device 270.

The CPU 201 is a unit that executes various operations. The CPU 201 executes various processes by executing a predetermined delivery plan making program loaded from the auxiliary storage device 230 to the RAM 210. Actually, the CPU 201 executes a process that is executed by the restriction alleviating unit 140 and the delivery plan making and cost calculating unit 130 according to the embodiment in accordance with the delivery plan making program.

The delivery plan making program is, for example, an application program that is executable on an OS (Operation System) program.

The delivery plan making program may be installed, for example, in the auxiliary storage device 230 from a portable storage medium through the medium reading device 260.

The RAM 210 is a memory that stores a program to be executed by the CPU 201, data required to execute the program, and the like.

The ROM 220 is a memory that stores a program required to activate the delivery plan making device 100 and the like.

The auxiliary storage device 230 is, for example, a device such as a HDD (Hard Disk Drive). An SSD (Solid State Drive) using a flash memory or the like may be used.

The storage unit 120 illustrated in FIG. 1 corresponds to at least a portion of a storage area of the RAM 210 and the auxiliary storage device 230. For example, information from the store information 160 to the restriction alleviation condition combination information 171 are stored in the auxiliary storage device 230. If necessary, at least a part of the information may be copied to the RAM 210.

The display device 240 is, for example, a device such as a CRT display, an LCD (Liquid Crystal Display), or an organic EL (Electro-Luminescence) display.

The input device 250 is, for example, a device such as a keyboard, a mouse, or a microphone.

The medium reading device 260 is a device that reads information of a portable storage medium such as a CD-ROM.

The communication device 270 inputs and outputs data from and to an external device through a network 280.

The delivery plan making device 100 may obtain the store information 160 from a store delivery amount managing device 290 through the network 280.

The delivery plan making device 100 may obtain the driver information 162 from a driver information managing device 292 through the network 280.

The delivery plan making device 100 may obtain the expressway toll information 164 and the distance information 165 from a road information managing device 294 through the network 280.

The display device 240 corresponds to the display unit 150 illustrated in FIG. 1, and the input device 250, the medium reading device 260, and the communication device 270 correspond to the input unit 110 illustrated in FIG. 1.

FIG. 3 is a flowchart illustrating an example of the delivery plan making process that is executed by the delivery plan making device 100 according to the embodiment of the invention.

In the delivery plan making process, (1) the input unit 110 executes an external data reading process 310 and stores the read data in the storage unit 120. Next (2) the delivery plan making and cost calculating unit 130 executes a delivery plan making process 320. Next, (3) the restriction alleviating unit 140 executes a restriction alleviation process 330 to generate a restriction alleviation plan, and (4) retrieves the result stored in the storage unit 120 and displays the retrieved result on the display unit 150.

Hereinafter, the respective processes (1) to (4) illustrated in FIG. 3 will be described with reference to FIGS. 4 to 20.

(1) External Data Reading Process 310

In the external data reading process 310 illustrated in FIG. 3, the input unit 110 reads the store information 160, the hub information 161, the driver information 162, the truck information 163, the expressway toll information 164, the distance information 165, the speed information 166, and the restriction alleviation condition information 167, which are external data, and stores the external data in the storage unit 120. Specifically, the input unit 110 obtains the external data from the medium reading device 260 or the communication device 270 and stores the obtained external data in the auxiliary storage device 230.

FIG. 4 is a diagram illustrating an example of the store information 160 that is referred to by the delivery plan making device 100 according to the embodiment of the invention.

The store information 160 includes at least data items that define a store name 410, a store delivery amount 420, an available store delivery time 430, and a store location 440. For example, the first record of the store information 160 illustrated in FIG. 4 indicates that a store having the name "A" (hereinafter, also referred to as "store A"; the same shall be applied to the other stores) is located in Kamakura, Kanagawa prefecture and it is necessary to deliver 1 ton of products to the store during a period from 0:00 to 1:00. That is, the available store delivery time 430 is a part of restriction conditions that need to be satisfied for making a delivery plan in the embodiment.

FIG. 5 is a diagram illustrating an example of the hub information 161 that is referred to by the delivery plan making device 100 according to the embodiment of the invention.

The hub information includes at least data items that define a hub name 510 and a hub location 520. The example of FIG. 5 indicates that a depot as a hub where, for example, products are temporarily stored and handled is located in Kouza, Kanagawa prefecture.

FIG. 6 is a diagram illustrating an example of the driver information 162 that is referred to by the delivery plan making device 100 according to the embodiment of the invention.

The driver information 162 is information relating to a driver as a delivery worker in the embodiment, and includes at least data items that define a driver name 610, actual workable time of a driver 620, and an overtime cost (unit cost) 630. The example of FIG. 6 indicates that a driver having a name "A" is workable for 180 minutes and, if the actual working time exceeds 180 minutes, the unit cost is 2000 yen per hour. In the embodiment, the actual workable time of a driver 620 is a part of restriction conditions that need to be satisfied for making a delivery plan. In addition, in the embodiment, the overtime cost 630 is a part of the cost information used for calculating a delivery cost based on the made delivery plan.

FIG. 7 is a diagram illustrating an example of the truck information 163 that is referred to by the delivery plan making device 100 according to the embodiment of the invention.

The truck information 163 includes at least data items that define a truck name 710, a maximum load capacity 720, a charge per truck 730, and a truck driver 740. Further, the truck information 163 may define a truck unloading time 750. The example of FIG. 7 indicates that the maximum load capacity of a truck having a name "normal truck" is 5 tons, the one-day charge thereof per truck is 10000 yen, the name of the driver who uses the truck is "A", and the time required to unload products from the truck is 40 minutes. In the embodiment, the truck charge 730 is a part of the cost information used for calculating a delivery cost based on the made delivery plan.

FIG. 8 is a diagram illustrating an example of the expressway toll information 164 that is referred to by the delivery plan making device 100 according to the embodiment of the invention.

The expressway toll information 164 includes at least data items that define a section 810 and an expressway toll 820. An example of the first record of FIG. 8 indicates that, if an expressway is used for movement between the depot and the store A, a toll of 4000 yen is required. Likewise, the expressway toll information 164 includes information of a toll if an expressway is used for movement between any hub and any store and between one store and another store. In the embodiment, the expressway toll information 164 is apart of the cost information used for calculating a delivery cost based on the made delivery plan.

FIG. 9 is a diagram illustrating an example of the distance information 165 that is referred to by the delivery plan making device 100 according to the embodiment of the invention.

The distance information 165 includes at least data items that define From 910 indicating a departure store or the hub, To 920 indicating an arrival store or the hub, a general road distance 930, and an expressway distance 940. For example, the second record of FIG. 9 indicates that a general road travel distance of a truck or the like from the departure of the store A to the arrival of the store B is 10 km and there is no expressway used for the movement. If there is an expressway section which can be used for movement from the store A to the store B, the length of the section is defined as the expressway distance 940. Likewise, the distance information 165 includes information of a travel distance between any hub and any store and between one store and another store.

FIG. 10 is a diagram illustrating an example of the speed information 166 that is referred to by the delivery plan making device 100 according to the embodiment of the invention.

The speed information 166 includes at least data items that define a general road speed 1020 and an expressway speed 1030. Further, the speed information 166 may define a time zone 1010. The example of FIG. 10 indicates that a general road is possible to travel at 30 km per hour and an expressway is possible to travel at 60 km per hour. These values may be, for example, an average speed or the like that is empirically obtained. For example, if the speed varies depending on time zones due to heavy traffic or traffic control, different speeds may be defined for the respective time zones.

FIG. 11 is a diagram illustrating an example of the restriction alleviation condition information 167 that is referred to by the delivery plan making device 100 according to the embodiment of the invention.

The restriction alleviation condition information 167 includes at least data items that define at least a restriction number 1110, an alleviation condition 1120, an alleviation width 1130, a maximum alleviation amount 1140, and an applicability 1150. The alleviation condition 1120 refers to a restriction condition that is a target for alleviation, the alleviation width 1130 refers to a pitch width of an alleviation amount if the alleviation condition is released, and the maximum alleviation amount 1140 refers to a maximum value of the allowable alleviation amount.

For example, the first record of FIG. 11 indicates an alleviation condition in which the available delivery time of the store A can be advanced in units of 30 minutes and can be advanced up to 60 minutes. However, a value "False" of the applicability 1150 corresponding to this alleviation condition represents that this alleviation condition is not applicable (that is, this alleviation condition is not a target for restriction alleviation). The value of the applicability 1150 can be set by a user through a restriction alleviation condition setting screen (FIG. 12) described below. When this alleviation condition is applicable, and the maximum alleviation amount "60 minutes" is applied, the available delivery time of the store A is advanced by 60 minutes and the delivery time is extended to a period of 11:00 to 1:00 (refer to FIG. 4).

Other examples of the alleviation condition of FIG. 11 include postponement of the available delivery time of the store D, reduction of an expressway usable distance, and extension of actual working time. The postponement of the delivery time represents that the available delivery time extends by postponing the termination of the available delivery time. The expressway usable distance refers to a shortest distance for the use of an expressway, that is, a value indicating the least travel distance (km) allowing the use of an expressway, and is stored in the storage unit 120 as a part of the restriction conditions. For example, if the value of the expressway usable distance is 30 km, the use of an expressway is allowed when the travel distance is 30 km or longer. If the value is alleviated to 0 km, the use of an expressway is allowed regardless of the distance. The extension of the actual working time represents that a driver works for longer than actual workable time of the driver, and a cost for the excess working time is calculated based on the overtime unit cost.

The restriction alleviation conditions illustrated in FIG. 11 are merely exemplary, and an alleviation condition can be set for any restrictions that need to be satisfied for making a delivery plan. By alleviating the restriction, a delivery plan can be made based on a restriction condition that cannot be set before the alleviation. For example, the kind of a usable truck (maximum load capacity), the number of trucks, and the like may be considered as restrictions that can be alleviated. In addition, use conditions of not only an expressway but also various roads may be considered as restrictions that can be alleviated. In addition, all the above-described restriction conditions may be alleviated, or only a part of restriction conditions may be alleviated.

FIG. 12 is a diagram illustrating an example of a restriction alleviation condition setting screen that is output from the delivery plan making device 100 according to the embodiment of the invention.

The restriction alleviation condition setting screen displays the restriction alleviation condition information 167 defined by the external data. For each of the restriction alleviation conditions, a target setting box 1210 for setting whether or not to set the restriction alleviation condition as a target for restriction alleviation is provided such that a selection by a user is accepted. In the embodiment, alleviation conditions that are checked by the user in the target setting box 1210 are set as targets for restriction alleviation. After the setting of the target for restriction alleviation by the user, the restriction alleviation condition information 167 stored in the storage unit 120 is retrieved for each of the restriction alleviation conditions. If the corresponding restriction alleviation condition is the target for restriction alleviation, the applicability 1150 is set as True, and if not the target for restriction alleviation, the applicability 1150 is set as False.

In the embodiment, a "store D delivery time postponement" condition of extending the termination of the delivery time 430 of the store D defined by the store information 160, an "expressway usable distance" condition of extending the shortest distance for the use of an expressway, and an "actual working time extension" condition of extending the actual working time of a truck driver are set as targets for restriction alleviation. That is, if the user checks the target setting boxes 1210 of the alleviation conditions in FIG. 12, the information is input to the restriction alleviation condition information stored in the storage unit 120. In the restriction alleviation condition information illustrated in FIG. 11, the applicability 1150 of the alleviation conditions of the restriction numbers 2, 3, and 4 set as the targets for alleviation in FIG. 12 are set as True, and the applicability 1150 of the other alleviation conditions are set as False.

In the embodiment, two types including a general road and an expressway are used as road types. However, another road type may be further added. In addition, the restriction alleviation condition information 167 may be generated by reading the external data, displaying the setting screen, and selecting alleviation conditions as targets for restriction alleviation.

When the input of the external data illustrated in FIGS. 4 to 11 ends, the delivery plan making device 100 starts (2) the delivery plan making process 320.

(2) Delivery Plan Making Process 320

In the delivery plan making process 320 illustrated in FIG. 3, the delivery plan making and cost calculating unit 130 makes a delivery plan such that a truck can arrive at each store within the available delivery time 430 of the store information 160 stored in the storage unit 120 and the actual working time of the truck is within the actual workable time of the driver 620 of the driver information 162 stored in the storage unit 120, assigns a delivery plan number, and stores the delivery plan in the delivery plan path information 168. The delivery plan making and cost calculating unit 130 makes a delivery plan, for example, using a general delivery plan making algorithm using metaheuristics or the like.

FIG. 13 is a diagram illustrating an example of the delivery plan path information 168 that is stored by the delivery plan making device 100 according to the embodiment of the invention.

The delivery plan path information 168 includes at least data items that define a delivery plan number 1310, a truck number 1320, a truck name 1330, From (a store or hub name from which a truck departs) 1340, To (a store or hub name at which a truck arrives) 1350, time required for the movement of a truck 1360, a work time 1370, an expressway use 1380, and total actual working time 1390.

FIG. 13 illustrates an example of information relating to a path of one delivery plan having a delivery plan number "No. 0". In this plan, four normal trucks having truck numbers "No. 1" to "No. 4" are used, and the truck having a truck number "No. 1" moves for delivery in order of the depot, the store A, and the store B and returns to the depot. The other trucks reciprocate between the depot and the store C, between the depot and the store D, and between the depot and the store E, respectively. The travel time 1360 in a section between the depot and each store and a section between the respective stores, the work time 1370, and the total actual working time 1390 which is the sum thereof are calculated. The expressway use 1380 represents whether or not the use of an expressway is allowed in each of the sections, and "x" illustrated in FIG. 13 represents the use of an expressway is not allowed in the section.

After making the delivery plan, the delivery plan making and cost calculating unit 130 generates delivery plan cost information using the delivery plan path information 168, the driver information 162, the truck information 163, and the expressway toll information 164 stored in the storage unit 120. If restriction alleviation is not executed when making the delivery plan, the delivery plan cost information is stored in the normal delivery plan cost information 169. If restriction alleviation is executed, the delivery plan cost information is stored in the restriction alleviation delivery plan cost information 170.

When generating the delivery plan cost information, the delivery plan making and cost calculating unit 130 calculates a total truck cost 1430 which is the sum of truck charges, a total expressway cost 1440 which is the sum of expressway tolls, and a total overtime cost 1450 which is the sum of overtime wages of the drivers, using the delivery plan path information 168 stored in the storage unit 120, and adds the three costs to calculate a total delivery cost 1420.

The total truck cost 1430 is obtained as follows. First, the delivery plan making and cost calculating unit 130 extracts information corresponding to the delivery plan number 1310 whose cost is desired to be calculated from the information included in the delivery plan path information 168 such that the values of the truck numbers 1320 do not overlap each other. Next, the truck name 1330 of information is specified, information having the truck name 710 as the corresponding truck name from the truck information 163 stored in the storage unit 120 is specified, and the truck charge 730 of the information is added to the total truck cost. In the example of FIG. 13, the delivery plan making and cost calculating unit 130 extracts first-line information as information in which the truck number 1320 is No. 1. Since the truck name 1330 of the first-line information is normal truck, information in which the truck name 710 is normal truck is specified from the truck information, and a truck charge of 10000 yen is added. Likewise, the delivery plan making and cost calculating unit 130 extracts fourth-line information as information in which the truck number 1320 is No. 2, extracts sixth-line information as information in which the truck number 1320 is No. 3, and extracts eighth-line information as information in which the truck number 1320 is No. 4, and 10000 yen is added for each information. As a result, the total truck cost 1430 is 40000 yen.

The total expressway cost 1440 is obtained as follows. Regarding information corresponding to the delivery plan number 1310 whose cost is desired to be calculated from the information included in the delivery plan path information 168, if the expressway use 1380 indicates the use of an expressway, the delivery plan making and cost calculating unit 130 retrieves the expressway toll information 164 stored in the storage unit 120, specifies the section 810 that matches with a section of the corresponding information from the From 1340 to the To 1350, and adds the expressway toll 820 of the specified information to the total expressway cost 1440. In the example of FIG. 13, the expressway use 1380 on all the lines of the delivery plan path information indicates that the use of an expressway is not allowed, and thus the total expressway cost is 0 yen.

The total overtime cost 1450 is obtained as follows. Regarding information corresponding to the delivery plan number 1310 whose cost is desired to be calculated from the information included in the delivery plan path information 168, the delivery plan making and cost calculating unit 130 adds the total actual working time 1390 of information having the same truck number 1320, and obtains the total actual truck working time for each truck number. Next, the delivery plan making and cost calculating unit 130 retrieves the truck information 163 stored in the storage unit 120, specifies information having the same truck name 710 as the truck name 1330 of each truck number 1320, and specifies the actual workable time of the driver 620 of information having the same driver name 610 in the driver information 162 stored in the storage unit 120 as the truck driver 740 of the specified information. Further, the delivery plan making and cost calculating unit 130 calculates a difference between the total actual truck working time and the specified actual workable time of the driver 620, for each truck numbers 1320 calculated above, as overtime hours. If the overtime hours are positive, a value of "Overtime Hours×Overtime Unit Cost of Driver Information 630" is added to the total overtime cost 1450.

In the embodiment, all the truck names 1330 of the delivery plan path information are normal truck, and the truck driver 740 of the truck information 163 is A. In the driver information 162, the actual workable time of the driver 620 of the driver A is 180 minutes. On the other hand, the total actual truck working time of the truck number No. 1 of the delivery plan path information 168 is 60 minutes+60 minutes+20 minutes=140 minutes, which is shorter than 180 minutes. Likewise, the total actual truck working time of the truck number No. 2 to No. 4 is shorter than 180 minutes. Therefore, the total overtime cost is 0 yen.

The above-described calculation of the delivery cost is merely exemplary. Actually, the delivery cost can be calculated using various methods based on various cost information. For example, a plurality of kinds of trucks having different maximum load capacities are usable. If the charge for use varies depending on the kinds, the truck information 163 includes information of the charge for use for each kind of a truck as cost information, and the delivery plan making and cost calculating unit 130 may calculate the delivery cost based thereon. In addition, if the unit cost (hourly wage) in the actual working time varies depending on drivers, the driver information 162 includes information of the unit cost in the actual working time for each driver as cost information, and the delivery plan making and cost calculating unit 130 may calculate the delivery cost based thereon. In addition, if necessary, the delivery cost may be calculated using only a part of the cost information.

FIG. 14 is a diagram illustrating an example of the normal delivery plan cost information 169 that is stored by the delivery plan making device 100 according to the embodiment of the invention.

The normal delivery plan cost information 169 includes at least data items that define the total delivery cost 1420, the total truck cost 1430, the total expressway cost 1440, and the total overtime cost 1450. The contents thereof are as described above with reference to FIG. 13. The normal delivery plan cost information 169 may further include a delivery plan number 1410 that specifies the delivery plan used for calculating the cost.

When the above-described delivery plan making process 320 ends, the delivery plan making device 100 starts (3) the restriction alleviation process 330.

(3) Restriction Alleviation Process 330

In the restriction alleviation process 330 of FIG. 3, the restriction alleviating unit 140 generates a restriction alleviation plan. The delivery plan making process 320 is executed on the generated restriction alleviation plan by the delivery plan making and cost calculating unit 130 to make a delivery plan, and the restriction alleviation delivery plan cost information is generated.

FIG. 15 is a flowchart illustrating an example of the restriction alleviation process that is executed by the delivery plan making device 100 according to the embodiment of the invention.

In the restriction alleviation process 330, first, the restriction alleviating unit 140 executes (3-1) a restriction alleviation extraction process 1510 of retrieving the restriction alleviation condition information 167 stored in the storage unit 120 and selecting one restriction where the delivery cost can be reduced by alleviating the restriction to the maximum and making a delivery plan. Next, the restriction alleviating unit 140 executes (3-2) a restriction alleviation plan generating process 1520 of combining a plurality of restrictions selected in (3-1) and changing the restrictions stepwise by the alleviation width 1130 of the restriction alleviation condition information 167 stored in the storage unit 120 to generate a restriction alleviation plan. Next, the restriction alleviating unit 140 executes (3-3) a delivery plan making and cost calculating process 1530 of the generated restriction alleviation plan. The restriction alleviating unit 140 repeats (3-2) and (3-3) until a restriction alleviation termination condition is satisfied. The restriction alleviation termination condition is, for example, making of delivery plans for all the restriction alleviation plans.

Hereinafter, each of the processes of FIG. 15 will be described.

(3-1) Restriction Alleviation Extraction Process 1510

When the applicability 1150 of each information included in the restriction alleviation condition information 167 stored in the storage unit 120 is True, the delivery plan making and cost calculating unit 130 and the restriction alleviating unit 140 execute the following process. That is, the restriction alleviating unit 140 alleviates the alleviation condition 1120 of the corresponding information to the maximum alleviation amount 1140, and the delivery plan making and cost calculating unit 130 executes the delivery plan making process 320 based on the alleviated restriction conditions to generate the delivery plan cost information. In a case where a total delivery cost 1620 (refer to FIG. 16) of the generated delivery plan cost information is lower than the total delivery cost 1420 of the normal delivery plan cost information (that is, before the alleviation) stored in the storage unit 120 (that is, the cost is reduced by alleviating the corresponding restriction condition), the applicability 1150 of the corresponding information is True. Otherwise, the applicability 1150 of the information is False.

Even when the alleviation condition 1120 is alleviated to the maximum alleviation amount 1140 as described above, if the delivery cost calculated based on the result thereof is higher than or equal to the delivery cost before the alleviation, it is determined that the cost is not likely to be reduced even after the alleviation, and the alleviation condition 1120 is excluded from a target for the following process. Accordingly, the following calculation for specifying the optimal alleviation amount is not executed on the alleviation condition 1120 where the cost is not likely to be reduced, and, therefore, the calculation amount is reduced. However, if it is not necessary to limit the calculation amount, the above-described process 1510 is omitted, and the applicability 1150 of all the alleviation conditions 1120 is set as True, and the following process may be executed on all the alleviation conditions 1120 as targets.

In the embodiment, the above-described process is executed on the values 2, 3, and 4 of the restriction number 1110 of the restriction alleviation condition information 167 of FIG. 11. In the case of the value 2 of the restriction number 1110, the available delivery time of the store D is postponed by 120 minutes. That is, while the available store delivery time 430 of the store D in the store information 160 of FIG. 4 is 2:50 to 3:30, the available store delivery time of the store D is postponed to 2:50 to 5:30 with the restriction alleviation. If the delivery plan making and cost calculating unit 130 executes the delivery plan making process 320 under this condition, a delivery plan using three normal trucks is obtained, and the cost becomes that the total truck cost is 30000 yen, the total expressway cost is 0 yen, the total overtime cost is 0 yen, and the total delivery cost is 30000 yen. This total delivery cost of 30000 yen is more inexpensive than the total delivery cost of 40000 yen of the normal delivery plan cost information illustrated in FIG. 14, and thus the applicability 1150 of the restriction alleviation condition information is still True.

When the above-described process is executed on the value 3 of the restriction number 1110, a delivery plan where three normal trucks are used and one expressway section is used is obtained, and the total truck cost is 30000 yen, the total expressway cost is 4000 yen, the total overtime cost is 0 yen, and the total delivery cost is 34000 yen. When the above-described process is executed on the value 4 of the restriction number 1110, a delivery plan where three normal trucks are used and one hour is required as the overtime time is obtained, and the total truck cost is 30000 yen, the total expressway cost is 0 yen, the total overtime cost is 1000 yen, and the total delivery cost is 31000 yen. As a result, the values 2, 3, and 4 of the restriction number 1110 are extracted.

(3-2) Restriction Alleviation Plan Generating Process 1520

The restriction alleviating unit 140 retrieves the restriction alleviation condition information 167 stored in the storage unit 120, selects one or more restrictions where the applicability 1150 is True, alleviates each of the restrictions by the alleviation width 1130 of the corresponding information to determine the alleviation amount, and makes a restriction alleviation plan. In the embodiment, three alleviation conditions including the store D time postponement, the expressway usable distance, and the actual working time extension where the applicability 1150 is True are selected from the restriction alleviation condition information 167 as targets for generating the restriction alleviation plan.

For example, if only the store D delivery time postponement is selected, the restriction alleviating unit 140 postpones the delivery time of the store D on a 10-minute basis such that a restriction alleviation plan where the delivery time of the store D is postponed by 10 minutes, and a restriction alleviation plan where the delivery time of the store D is postponed by 20 minutes, and generates 12 restriction alleviation plans including a restriction alleviation plan alleviated up to 120 minutes at most. Likewise, if only the expressway usable distance is selected, the restriction alleviating unit 140 reduces the expressway usable distance on a 10-km basis such that a restriction alleviation plan where the expressway usable distance is 100 km, and a restriction alleviation plan where the expressway usable distance is 90 km, and generates 10 restriction alleviation plans including a restriction alleviation plan alleviated up to 0 km at most. If an initial value of the expressway usable distance before the alleviation is infinite (that is, an expressway is not used regardless of the travel distance), it is not possible to calculate the expressway usable distance after the alleviation by applying the alleviation width to the initial value. Therefore, a value (for example, 100 km) of the expressway usable distance when the alleviation is executed to the minimum may be predetermined. The same calculation as above can be executed on the actual working time extension.

In addition, for example, if two conditions including the store D delivery time postponement and the expressway usable distance are selected, the restriction alleviating unit 140 makes all the combinations of restriction alleviation plans for each alleviation amount of each restriction, such as a restriction alleviation plan where the delivery time of the store D is postponed by 10 minutes and the expressway usable distance is 100 km, or a restriction alleviation plan where the delivery time of the store D is postponed by 20 minutes and the expressway usable distance is 100 km.

When one restriction alleviation plan is determined by (3-2), the process proceeds to (3-3).

(3-3) Delivery Plan Making and Cost Calculating Process 1530 of Restriction Alleviation Plan The delivery plan making and cost calculating unit 130 executes the delivery plan making process 320 on the restriction alleviation plan determined by (3-2) to generate the delivery plan cost information.

If the total delivery cost of the generated delivery plan cost information is lower than the total delivery cost 1420 of the normal delivery plan cost information 169 stored in the storage unit 120, the delivery plan making and cost calculating unit 130 assigns a delivery plan number, stores the generated delivery plan in the delivery plan path information 168, stores the restriction alleviation plan used for generating the delivery plan in the restriction alleviation condition combination information 171, and stores the generated delivery plan cost information in the restriction alleviation delivery plan cost information 170.

In the embodiment, as a result of executing (3-2) and (3-3), five restriction alleviation condition combinations illustrated in FIG. 17 are generated as restriction alleviation combinations which reduce the total delivery cost to be lower than the total delivery cost 1420 of the normal delivery plan cost information 169. In the delivery plan numbers No. 1, No. 2, and No. 3 of FIG. 17, a single restriction condition (for example, the store D delivery time in No. 1) is alleviated. In the delivery plan numbers No. 4 and No. 5, two restriction conditions (for example, whether or not to use an expressway and the store D delivery time in No. 4) are alleviated. The delivery plan cost for a delivery plan number 1710 of FIG. 17 is stored in information having the same delivery plan number 1610 of FIG. 16. For example, the delivery plan number No. 1 is an restriction alleviation plan where the store D delivery time is postponed by 10 minutes, and the restriction alleviation delivery plan cost information 170 indicates that, when the restriction condition is alleviated according to the restriction alleviation plan, the total delivery cost is 30000 yen, the total truck cost 30000 yen, and the other cots are 0 yen.

FIG. 16 is a diagram illustrating an example of the restriction alleviation delivery plan cost information 170 that is stored by the delivery plan making device 100 according to the embodiment of the invention.

The restriction alleviation delivery plan cost information 170 includes at least data items that define the delivery plan number 1610, the total delivery cost 1620, a total truck cost 1630, a total expressway cost 1640, and a total overtime cost 1650.

FIG. 17 is a diagram illustrating an example of the restriction alleviation condition combination information 171 that is stored by the delivery plan making device 100 according to the embodiment of the invention.

The restriction alleviation condition combination information 171 includes at least data items that define the delivery plan number 1710, a restriction alleviation 1720, and an alleviation width 1730.

After the end of the delivery plan making and cost calculating process 1530 of the restriction alleviation plan, the delivery plan making and cost calculating unit 130 checks (process 1540) the termination condition (for example, whether or not delivery plans are made for all the restriction alleviation plans). If the termination condition is not satisfied, the process returns to (3-2). In a case where the termination condition is satisfied, a result output process 340 starts.

(4) Result Output Process 340

In the result output process 340 of FIG. 3, the display unit 150 displays the delivery plan path information, the restriction alleviation delivery plan cost information, and the restriction alleviation condition combination information stored in the storage unit 120. For example, the CPU 201 may generate data of a screen that displays the restriction alleviation plan and the delivery cost calculated based thereon, and the like to output to the display device 240 such that the display device 240 displays the corresponding screen. An example of the displayed results is illustrated in FIGS. 18 to 20.

FIG. 18 is a diagram illustrating an example of restriction alleviation and delivery cost display screen that is output from the delivery plan making device 100 according to the embodiment of the invention.

The restriction alleviation and delivery cost display screen displays a combination of the restriction alleviation condition combination information 171 and the restriction alleviation delivery plan cost information 170 stored in the storage unit 120. The restriction alleviation and delivery cost display screen includes at least data items that display the total delivery cost obtained by the restriction alleviation and the alleviation width of each restriction. Accordingly, the user can easily understand a combination of restriction alleviations necessary for reducing the delivery cost and widths of the restriction alleviations.

FIG. 19 is a diagram illustrating an example of a graph display of restriction alleviations and delivery cost amounts that are output from the delivery plan making device 100 according to the embodiment of the invention.

The graph display of restriction alleviations and delivery cost amounts displays the restriction alleviation condition combination information 171 and the restriction alleviation delivery plan cost information 170 stored in the storage unit 120. The graph display of restriction alleviations and delivery cost amounts displays the total delivery cost with respect to axes representing the alleviation widths of the restriction conditions necessary for reducing the delivery cost, which were obtained by retrieving the restriction alleviation delivery plan cost information 170 and the restriction alleviation condition combination information 171. In the embodiment, a circle 1910 (or any arbitrary figure may be used) is displayed at a position on a coordinate space corresponding to the sizes of the two alleviation widths with the store D delivery time postponement as the horizontal axis and the actual working hour extension as the vertical axis, and the delivery cost is displayed using the size thereof. In addition, the numerical value of the delivery cost is displayed in the circle 1910 or a speech balloon 1920 corresponding to the circle 1910. Accordingly, the user can easily understand the total delivery cost with respect to the cost generated by the restriction alleviation.

FIG. 20 is a diagram illustrating an example of a delivery plan Gantt chart display screen that is output from the delivery plan making device 100 according to the embodiment of the invention.

The delivery plan Gantt chart display screen displays the delivery plan path information stored in the storage unit 120. In the delivery plan Gantt chart display screen, the horizontal axis represents the time, and the vertical axis represents the truck (for example, the truck number). The delivery plan path information stored in the storage unit 120 is retrieved and displayed using a frame 2010 in which the width represents the time required for the work content of the truck by the user specifying the delivery plan number. In the embodiment, movement using a general road is displayed with an oblique line background, movement using an expressway is displayed with a dot background, and unloading is displayed with no background in the frame 2010. Accordingly, the user can easily understand the work contents of the truck. The embodiment displays the background pattern changing according to the work contents. However, each of the work contents may be displayed by blue or red.

According to the embodiment of the invention described above, a plurality of restriction alleviation plans are automatically made, the respective delivery costs are calculated, and the calculation result is displayed in a form that the user can easily understand. The user can select restrictions which are easily changeable, such that the delivery cost can be reduced.

The invention is not limited to the above-described embodiments and includes various modification examples. For example, the embodiments have been described in detail in order to easily describe the invention, and all the above-described configurations may not necessarily to be included. In addition, addition, deletion, and substitution of another configuration can be made for a part of the configuration of each embodiment.

In addition, some or all of the above-described respective configurations, functions, process units, process means, and the like may be realized by hardware, for example, by designing an integrated circuit. In addition, the respective configurations, functions, and the like may be realized by software by a processor interpreting and executing a program that realizes each of the functions. Information of a program, a table, a file, or the like that realizes each of the functions can be stored in a recording device such as a memory, a hard disk, or an SSD (Solid State Drive) or a non-transitory data storage medium such as an IC card, an SD card, or a DVD.

In addition, control lines and information lines indicate what is considered necessary for the explanations but all control lines or information lines necessary for the products are not necessarily included. It can be considered that almost of all components are actually interconnected.

The invention claimed is:

1. A delivery plan making system for making a delivery plan of an article, the system comprising:
    a storage device to store:
        a restriction condition for making a delivery plan and cost information; and
        restriction alleviation condition information indicating, for one or more alleviation conditions, an alleviation condition name, a maximum alleviation amount of the restriction condition, an alleviation pitch width, and an applicability field;
    a display unit;
    a CPU;
    a memory in communication with the CPU, the memory storing a plurality of instructions executable by the CPU to cause the CPU to:
        display, using the display unit, a setting screen user interface displaying the one or more alleviation conditions retrieved from the storage device, which are selectable as a target for restriction alleviation via an input device of a user,
        receive a selection of one or more alleviation conditions by the user via the input device,
        update the applicability field of the restriction alleviation condition information in the storage device for each of the selected one or more alleviation conditions,
        generate a delivery plan before alleviation of the restriction condition to satisfy the restriction condition, and
        calculate a delivery cost of the generated delivery plan before the alleviation based on the cost information,
        retrieve the one or more alleviation conditions and associated restriction alleviation condition information from the storage device based on the applicability field of the restriction alleviation condition information,
        alleviate each of the retrieved alleviation conditions by the alleviation pitch width by the maximum alleviation amount of the restriction condition to generate a restriction alleviation plan,
        generate an alleviated delivery plan after alleviation of the restriction condition to satisfy the restriction alleviation plan,
        determine whether the delivery cost of the alleviated delivery plan after the alleviation is lower than the delivery cost of the delivery plan before the alleviation, and if so;
            generate one or more additional restriction alleviation plans in which the restriction condition is alleviated by an alleviation amount smaller than the maximum alleviation amount,
            generate one or more alleviated additional delivery plans based on the one or more generated additional restriction alleviation plans,
            determine delivery cost of the alleviated delivery plan and the one or more alleviated additional delivery plans after the alleviation based on the cost information, and render the alleviated delivery plan and the one or more alleviated additional delivery plans to the display unit in the form of a graph display, wherein axes of the graph display correspond to two or more alleviation conditions incremented according to the respective alleviation pitch widths; and each of the alleviated delivery plan and the one or more alleviated additional delivery plans are displayed as a separate figure positioned on a coordinate space of the graph display corresponding to the respective alleviation amounts and having a size based on the respective determined delivery costs.

2. The delivery plan making system according to claim 1, wherein the restriction condition includes at least one of a delivery time of the articles to a delivery destination, an actual working time of a delivery worker, and a use condition of a road for delivery, and the cost information includes at least one of a charge for use of a vehicle for delivery, an overtime wage of the delivery worker, and a toll of the road.

3. The delivery plan making system according to claim 2, wherein the storage device further include:

delivery destination information indicating locations of one or more delivery destinations, an article amount to be delivered to each delivery destination, hub information indicating locations of one or more delivery hubs, speed information indicating a moving speed on a path where the vehicle travels, worker information indicating the actual working time of the delivery worker, vehicle information indicating a maximum load capacity of the vehicle, the delivery worker who uses the vehicle, a time required to unload the articles from the vehicle, and distance information indicating a travel distance between each of the hubs and each delivery destination and a travel distance between the respective delivery destinations, and the CPU generates the delivery plan before and after the alleviation to satisfy the restriction condition and the restriction alleviation plan based on the delivery destination information, the hub information, the speed information, the worker information, and the distance information.

4. The delivery plan making system according to claim 2, further comprising the display unit that displays a kind and an alleviation amount of the restriction condition alleviated in the restriction alleviation plan and a cost of the delivery plan after the alleviation.

5. A delivery plan making method for making a delivery plan of articles by a computer system including a CPU and a storage device connected to the CPU, wherein the storage device stores a restriction condition for making a delivery plan and cost information, and restriction alleviation condition information indicating, for one or more alleviation conditions, an alleviation condition name, a maximum alleviation amount of the restriction condition, an alleviation pitch width, and an applicability field, the delivery plan making method comprising:

displaying, using a display device, a setting screen user interface displaying the one or more alleviation conditions retrieved from the storage device, which are selectable as a target for restriction alleviation via an input device of a user;

receiving a selection of one or more alleviation conditions by the user via the input device;

updating the applicability field of the restriction alleviation condition information in the storage device for each of the selected one or more alleviation conditions;

generating, using the CPU, a delivery plan before alleviation of the restriction condition to satisfy the restriction condition;

calculating, using the CPU, a delivery cost of the generated delivery plan before the alleviation based on the cost information;

retrieving the one or more alleviation conditions and associated restriction alleviation condition information from the storage device based on the applicability field of the restriction alleviation condition information, alleviating each of the retrieved alleviation conditions by the alleviation pitch width by the maximum alleviation amount of the restriction condition to generate a restriction alleviation plan;

generating, using the CPU, an alleviated delivery plan after alleviation of the restriction condition so as to satisfy the restriction alleviation plan;

determining whether the delivery cost of the alleviated delivery plan after the alleviation is lower than the delivery cost of the delivery plan before the alleviation;

generating one or more additional restriction alleviation plans in which the restriction condition is alleviated by an alleviation amount smaller than the maximum alleviation amount;

generating one or more alleviated additional delivery plans based on the one or more generated additional restriction alleviation plans;

determining, using the CPU, a delivery cost of the alleviated delivery plan and the one or more alleviated additional delivery plans after the alleviation based on the cost information; and rendering, using the CPU, the alleviated delivery plan and the one or more alleviated additional delivery plans to the display device in the form of a graph display, wherein axes of the graph display correspond to two or more alleviation conditions incremented according to the respective alleviation pitch widths; and each of the alleviated delivery plan and the one or more alleviated additional delivery plans are displayed as a separate figure positioned on a coordinate space of the graph display corresponding to the respective alleviation amounts and having a size based on the respective determined delivery costs.

6. The delivery plan making method according to claim 5, wherein the restriction condition includes at least one of a delivery time of the articles to a delivery destination, an actual working time of a delivery worker, and a use condition of a road for delivery, and the cost information includes at least one of a charge for use of a vehicle for delivery, an overtime wage of the delivery worker, and a toll of the road.

7. The delivery plan making method according to claim 6, wherein
the storage device further includes:
delivery destination information indicating locations of one or more delivery destinations,
an article amount to be delivered to each delivery destination,
hub information indicating locations of one or more delivery hubs,
speed information indicating a travel speed on a path where the vehicle travels,
worker information indicating the actual working time of the delivery worker,
vehicle information indicating a maximum load capacity of the vehicle,
the delivery worker who uses the vehicle,
a time required to unload the articles from the vehicle,
distance information indicating a travel distance between each hub and each delivery destination, and
a travel distance between the respective delivery destinations, wherein
the CPU makes the delivery plan before the alleviation to satisfy the restriction condition based on the delivery destination information, the hub information, the speed information, the worker information, and the distance information, and
the CPU makes the delivery plan after the alleviation to satisfy the restriction alleviation plan based on the delivery destination information, the hub information, the speed information, the worker information, and the distance information.

8. The delivery plan making method according to claim 6, wherein
the display device displays a kind and an alleviation amount of the restriction condition alleviated in the restriction alleviation plan and a cost of the delivery plan after the alleviation.

* * * * *